United States Patent
Dong

(10) Patent No.: US 10,852,774 B2
(45) Date of Patent: Dec. 1, 2020

(54) FOLDABLE MOBILE TERMINAL WITH FLEXIBLE SCREEN

(71) Applicant: Wuhan China Star Optoelectronics Semiconductor Display Technology Co., Ltd., Wuhan (CN)

(72) Inventor: Leilei Dong, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/339,006

(22) PCT Filed: Nov. 1, 2018

(86) PCT No.: PCT/CN2018/113307
§ 371 (c)(1),
(2) Date: Apr. 3, 2019

(87) PCT Pub. No.: WO2020/042334
PCT Pub. Date: Mar. 5, 2020

(65) Prior Publication Data
US 2020/0159291 A1    May 21, 2020

(30) Foreign Application Priority Data

Aug. 28, 2018 (CN) .......................... 2018 1 0989585

(51) Int. Cl.
*H05K 5/03* (2006.01)
*G06F 1/16* (2006.01)
*H04M 1/02* (2006.01)

(52) U.S. Cl.
CPC .......... *G06F 1/1681* (2013.01); *G06F 1/1641* (2013.01); *H04M 1/0214* (2013.01)

(58) Field of Classification Search
CPC ................................... H05K 5/00; H05K 5/03
See application file for complete search history.

(56) References Cited

U.S. PATENT DOCUMENTS

2017/0156219 A1* 6/2017 Heo .................... G09F 9/301

* cited by examiner

*Primary Examiner* — Jerry Wu

(57) ABSTRACT

A foldable mobile terminal with a flexible screen is provided in the present disclosure. The foldable mobile terminal with the flexible screen comprises a housing panel, a flexible display, a side plate, a primary back plate, an extending back plate, a support hinge storage case, a plurality of hinge operation buttons, a display pulling belt storage case, and a display pulling belt. A support hinge is disposed inside the support hinge storage case, and one end of the display pulling belt is fixedly connected to the flexible display extending over the support hinge storage case.

17 Claims, 3 Drawing Sheets

FOLDABLE MOBILE TERMINAL WITH FLEXIBLE SCREEN

RELATED APPLICATIONS

This application is a National Phase of PCT Patent Application No. PCT/CN2018/113307 having International filing date of Nov. 1, 2018, which claims the benefit of priority of Chinese Patent Application No. 201810989585.2 filed on Aug. 28, 2018. The contents of the above applications are all incorporated by reference as if fully set forth herein in their entirety.

FIELD AND BACKGROUND OF THE INVENTION

The present invention relates to a field of a mobile terminal and in particular, to a foldable mobile terminal with a flexible screen.

Mobile terminals, as communication devices, have become indispensable to most people in modern society. Organic light emitting diode (OLED) technology is becoming increasingly popular for use in the field of mobile terminals, so more and more new OLED screens, such as a curved screen, a wide screen, a flexible screen, are coming out. The flexible screens are expected to be extensively used in flexible display devices in the future. At present, the flexible screen has a smallest folding radius of 3 mm, and most of foldable mobile terminals in the market adopt a folding design which can make the mobile terminal folded up. However, this leads to a large increase in a thickness of the foldable mobile terminal, or causes a black line in the folded zone to compromise user experience.

In summary, the conventional foldable mobile terminal with the flexible screen adopts the folding design which can make the mobile terminal folded up, and therefore the thickness of the mobile terminal greatly increases.

SUMMARY OF THE INVENTION

The present invention provides a foldable mobile terminal with a flexible screen. The foldable mobile terminal with the flexible screen comprises a housing panel, a flexible display, a side plate, a primary back plate, an extending back plate, a support hinge storage case, a plurality of hinge operation buttons, a display pulling belt storage case, and a display pulling belt; wherein the support hinge storage case is disposed inside the side plate, a support hinge is disposed inside the support hinge storage case, one end of the support hinge is connected to the housing panel, another end of the support hinge is fixedly connected to the support hinge storage case through the hinge operation button, one end of the display pulling belt is received in the display pulling belt storage case, another end of the display pulling belt is fixedly connected to the flexible display extending over the support hinge storage case, one end of the flexible display is extended to a surface of the support hinge storage case, which faces the primary back plate, another end of the flexible display is disposed on a surface of the support hinge in a pulled-out state and is fixedly connected to the display pulling belt extending over the support hinge storage case.

In the foldable mobile terminal with the flexible screen according to one embodiment of the present invention, two ends of the flexible display are disposed on a surface of the support hinge in the pulled-out state and are fixedly connected to the display pulling belt extending over the support hinge storage case.

In the foldable mobile terminal with the flexible screen according to one embodiment of the present invention, the display pulling belt is made of an elastic material.

In the foldable mobile terminal with the flexible screen according to one embodiment of the present invention, a surface roughness of the side plate is less than a surface roughness of the primary back plate.

In the foldable mobile terminal with the flexible screen according to one embodiment of the present invention, the support hinge consists of a plurality of hinge units, each hinge unit includes a hinge belt and a joint hinge, and the hinge belt and the joint hinge are integrally formed in one piece.

In the foldable mobile terminal with the flexible screen according to one embodiment of the present invention, each hinge operation button is disposed between two adjacent ones of the hinge units, and a length of the hinge unit is a distance between two adjacent ones of the hinge operation buttons.

In the foldable mobile terminal with the flexible screen according to one embodiment of the present invention, a driving motor is disposed on the support hinge storage case.

In the foldable mobile terminal with the flexible screen according to one embodiment of the present invention, a thickness of each of the hinge operation buttons in a resting state is greater than a thickness of the hinge belt, and the support hinge is fixed to the surface of the housing panel.

In the foldable mobile terminal with the flexible screen according to one embodiment of the present invention, a thickness of each of the hinge operation buttons in a stretched state is less than a thickness of the hinge belt. The flexible display is extendably connected to the display pulling belt.

The present invention provides a foldable mobile terminal with a flexible screen. The foldable mobile terminal with the flexible screen comprises a housing panel, a flexible display, a side plate, a primary back plate, an extending back plate, a support hinge storage case, a plurality of hinge operation buttons, a display pulling belt storage case, and a display pulling belt; wherein the support hinge storage case is disposed inside the side plate, a support hinge is disposed inside the support hinge storage case, one end of the support hinge is connected to the housing panel, another end of the support hinge is fixedly connected to the support hinge storage case through the hinge operation button, one end of the display pulling belt is received in the display pulling belt storage case, and another end of the display pulling belt is fixedly connected to the flexible display extending over the support hinge storage case.

In the foldable mobile terminal with the flexible screen according to one embodiment of the present invention, two ends of the flexible display are disposed on a surface of the support hinge in a pulled-out state and are fixedly connected to the display pulling belt extending over the support hinge storage case.

In the foldable mobile terminal with the flexible screen according to one embodiment of the present invention, the display pulling belt is made of an elastic material.

In the foldable mobile terminal with the flexible screen according to one embodiment of the present invention, a surface roughness of the side plate is less than a surface roughness of the primary back plate.

In the foldable mobile terminal with the flexible screen according to one embodiment of the present invention, the support hinge consists of a plurality of hinge units, each hinge unit includes a hinge belt and a joint hinge, and the hinge belt and the joint hinge are integrally formed in one piece.

In the foldable mobile terminal with the flexible screen according to one embodiment of the present invention, each hinge operation button is disposed between two adjacent ones of the hinge units, and a length of the hinge unit is a distance between two adjacent ones of the hinge operation buttons.

In the foldable mobile terminal with the flexible screen according to one embodiment of the present invention, a driving motor is disposed on the support hinge storage case.

In the foldable mobile terminal with the flexible screen according to one embodiment of the present invention, a thickness of each of the hinge operation buttons in a resting state is greater than a thickness of the hinge belt, and the support hinge is fixed to a surface of the housing panel.

In the foldable mobile terminal with the flexible screen according to one embodiment of the present invention, a thickness of each of the hinge operation buttons in a stretched state is less than a thickness of the hinge belt, and the flexible display is extendably connected to the display pulling belt. The advantages of the foldable mobile terminal with the flexible screen of the present invention are as follows. The flexible display received in the housing panel is pulled out by the display pulling belt, and at the same time the support hinge is pulled out to support the flexible display. Accordingly, a size of the flexible display can be adjusted easily as desired, a thickness of the foldable mobile terminal decreases, and the foldable mobile terminal has good operability.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, a person having ordinary skill in this field can obtain other figures according to these figures without an inventive work or paying the premise.

DESCRIPTION OF SPECIFIC EMBODIMENTS OF THE INVENTION

Embodiments of the present disclosure are described in detail with reference to the accompanying drawings as follows. Directional terms such as up/down, right/left and the like may be used for the purpose of enhancing a reader's understanding about the accompanying drawings, but are not intended to be limiting. Specifically, the terminologies in the embodiments of the present disclosure are merely for the purpose of describing certain embodiments, but not intended to limit the scope of the invention. The same reference numbers are used throughout the drawings to refer to the same or similar parts.

The present invention provides a foldable mobile terminal with a flexible screen, wherein the foldable mobile terminal with the flexible screen comprises a housing panel, a flexible display, a side plate, a primary back plate, an extending back plate, a support hinge storage case, a plurality of hinge operation buttons, a display pulling belt storage case, and a display pulling belt; wherein the support hinge storage case is disposed inside the side plate, a support hinge is disposed inside the support hinge storage case, one end of the support hinge is connected to the housing panel, another end of the support hinge is fixedly connected to the support hinge storage case through the hinge operation button, one end of the display pulling belt is received in the display pulling belt storage case, another end of the display pulling belt is fixedly connected to the flexible display extending over the support hinge storage case.

Figure 1:
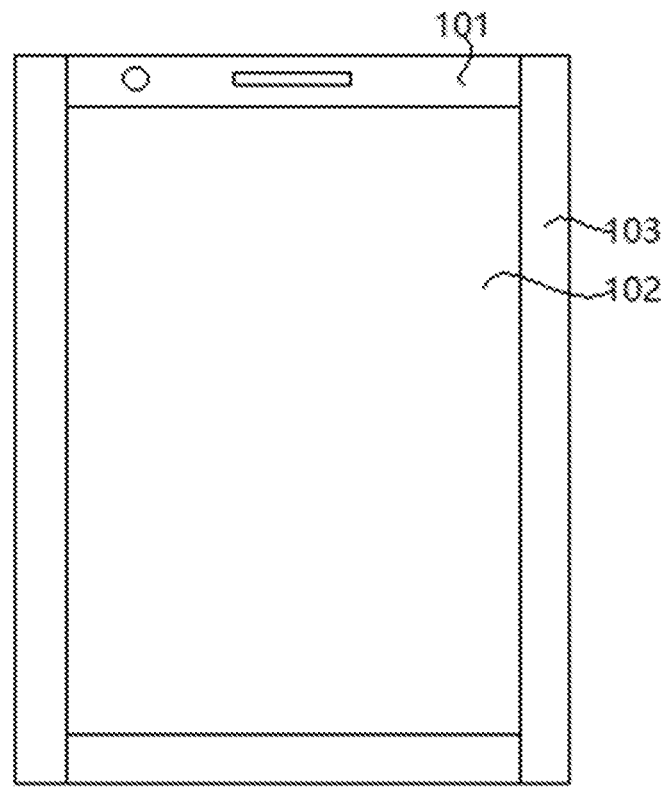
FIG. 1 is a front view showing that a foldable mobile terminal with a flexible screen is in a collapsed state.

FIG. 1 is a front view showing that a foldable mobile terminal with a flexible screen is in a collapsed state according to one embodiment of the present invention. A flexible display 102 is disposed on a housing panel 101. Two side plates 103 are disposed at two sides of the housing panel 101. The two side plates 103 are fixed to the flexible display 102.

Figure 2:
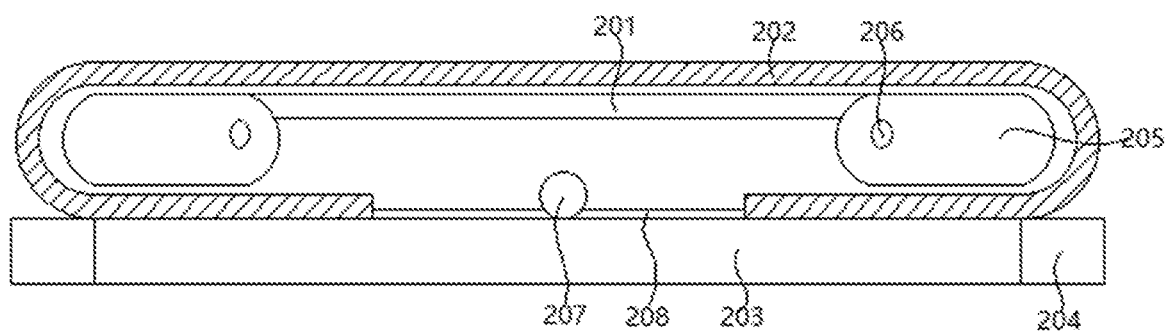
FIG. 2 is a cross-sectional view showing that the foldable mobile terminal with the flexible screen is in the collapsed state of FIG. 1.

FIG. 2 is a cross-sectional view showing that the foldable mobile terminal with the flexible screen is in the collapsed state. A flexible display 202 is disposed on a surface of a housing panel 201. A primary back plate 203 is disposed on a back side of the housing panel 201. Two extending back plates 204 are disposed at two ends of the primary back plate 203 and are received in the primary back plate 203. Two support hinge storage cases 205 are disposed inside two side plates. A hinge operation button 206 is disposed on the support hinge storage case 205. A display pulling belt storage case 207 is disposed on a surface of the primary back plate 203. A display pulling belt 208 is disposed inside the display pulling belt storage case 207 and is connected to the flexible display 202. A support hinge is disposed inside the support hinge storage case 205. The support hinge is fixed to a surface of the housing panel 201 through the hinge operation button 206.

A thickness of each of the hinge operation buttons 206 in a resting state is greater than a thickness of a hinge belt, and the support hinge is fixed to the surface of the housing panel 201.

When the foldable mobile terminal with the flexible screen is in the collapsed state, an excess portion of the flexible display 202 is pulled inside the housing panel 201 for storage. The extending back plate 204 is retracted into the primary back plate 203, the hinge operation button 206 is in a loose state, and the support hinge is received and locked in the support hinge storage case 205.

It is preferable that, the display pulling belt 208 is made of an elastic material. Therefore, the display pulling belt 208 can constantly stay in a stretching state, thereby ensuring that the flexible display 202 continuously maintains in a flat and even state.

It is preferable that, a material inside the side plate is soft, and a surface roughness of the side plate is less than a surface roughness of the primary back plate. This facilitates pulling up the flexible display 202 retracted inside the side plate.

It is preferable that the support hinge consists of a plurality of hinge units, each hinge unit includes a hinge belt and a joint hinge, and the hinge belt and the joint hinge are integrally formed in one piece.

It is preferable that, each hinge operation button 206 is disposed between two adjacent ones of the hinge units, and a length of the hinge unit is a distance between two adjacent ones of the hinge operation buttons 206.

It is preferable that, a driving motor is disposed on the support hinge storage case 207, so the flexible display 202 can be expanded by the driving motor instead of using manpower.

Figure 3:
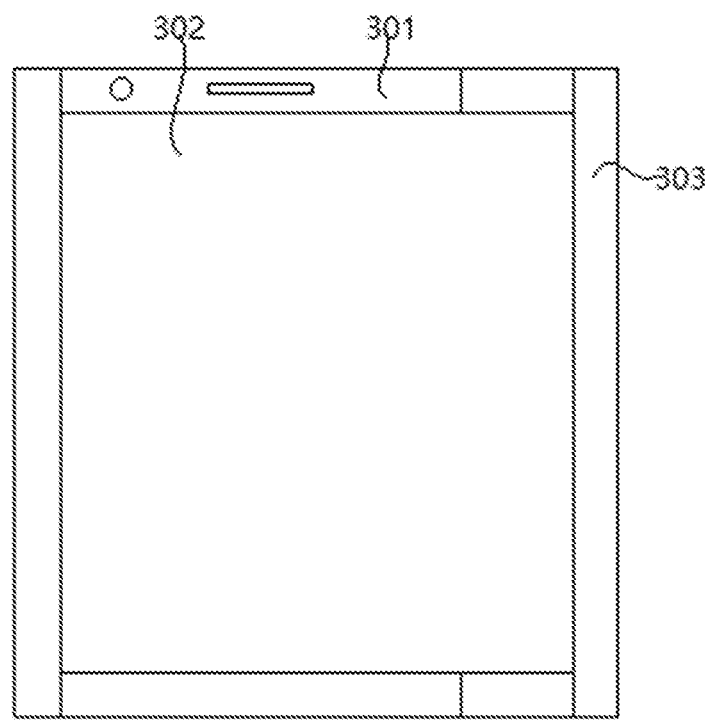
FIG. 3 is a front view showing that the foldable mobile terminal with the flexible screen is in a single-end expanded state.

FIG. 3 is a front view showing that the foldable mobile terminal with the flexible screen is in a single-end expanded state. A flexible display 302 is disposed on a surface of a housing panel 301. Two side plates 303 are disposed at two sides of the housing panel 301. The side plate 303 at one side is fixed to the flexible display 302. The side plate 303 at the other side is fixed to the flexible display 302 through a support hinge.

Figure 4:
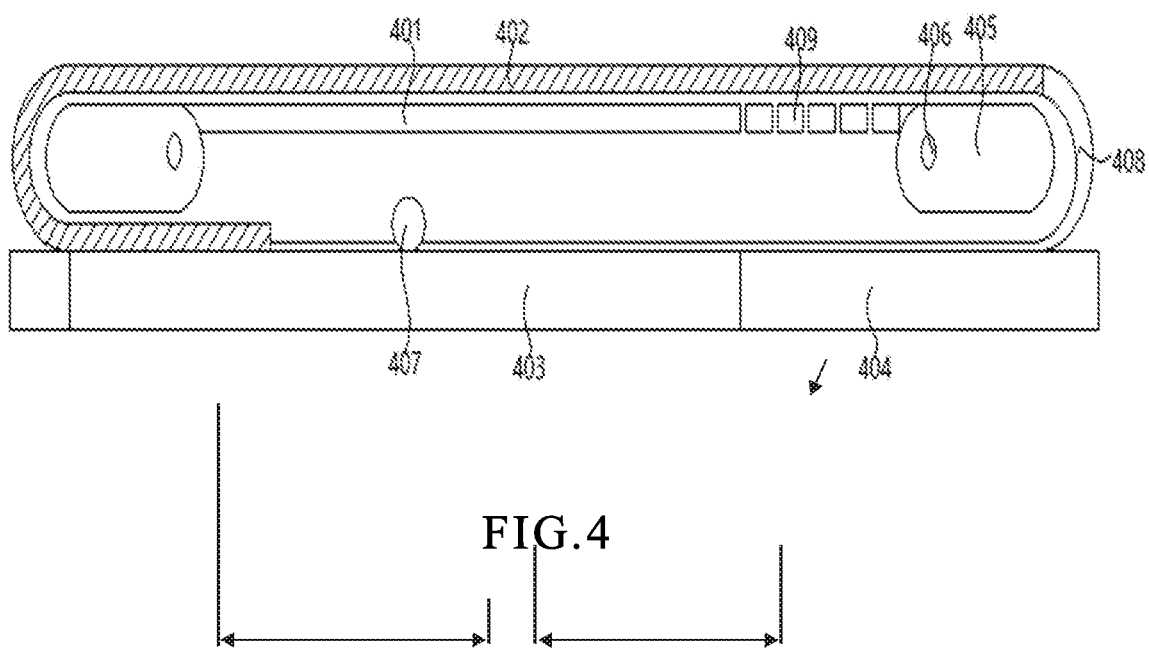
FIG. 4 is a cross-sectional view showing that the foldable mobile terminal with the flexible screen is in the single-end expanded state of FIG. 3.

FIG. 4 is a cross-sectional view showing that the foldable mobile terminal with the flexible screen is in the single-end expanded state. A flexible display 402 is disposed on a surface of a housing panel 401. A primary back plate 403 is disposed on a back side of the housing panel 401. Two extending back plates 404 are disposed at two ends of the primary back plate 403. The extending back plate 404 at one end of the primary back plate 403 is received inside the primary back plate 403, and the extending back plate 404 at the other end is fully expanded and connected to the other end of the primary back plate 403. Two support hinge storage cases 405 are disposed inside the two side plates. A hinge operation button 406 is disposed on the support hinge storage case 405. A display pulling belt storage case 407 is disposed on a surface of the primary back plate 403. A display pulling belt 408 is disposed inside the display pulling belt storage case 407 and is connected to the flexible display 402. A support hinge 409 is disposed inside the support hinge storage case 405. The support hinge 409 is fixed to a surface of the housing panel 401 through the hinge operation button 406.

One end of the flexible display 402 is extended to a surface of the support hinge storage case 407, which faces the primary back plate 403. Another end of the flexible display 402 is disposed on a surface of the support hinge 409 in a pulled-out state and is fixedly connected to the display pulling belt 408 extending over the support hinge storage case 407.

A thickness of each of the hinge operation buttons 406 in a stretched state is less than a thickness of the hinge belt, and the flexible display 402 is extendably connected to the display pulling belt 408.

By pressing on the hinge operation button 406 and manually exerting a force to the side plate at one side of the hinge operation button 406, the hinge belt moves. The flexible display 402 is extendably connected to the display pulling belt 408. The display pulling belt 408 pulls out the flexible display 402 received at one side of the inside of the housing panel 401 and at the same time pulls out the support hinge 409. When the flexible display 402 is pulled to a suitable position, the hinge operation button 406 is released, so that the support hinge 409 is locked, and the mobile terminal is in a single-end expanded state.

It is preferable that, the display pulling belt 408 is made of an elastic material, so that the display pulling belt 408 can constantly stay in a stretching state, thereby ensuring that the flexible display 402 continuously maintains in a flat and even state.

It is preferable that, a material inside the side plate is soft, and a surface roughness of the side plate is less than a surface roughness of the primary back plate. This facilitates pulling up the flexible display 402 received inside the side plate.

It is preferable that, the support hinge 409 consists of a plurality of hinge units, each hinge unit includes a hinge belt and a joint hinge, and the hinge belt and the joint hinge are integrally formed in one piece.

It is preferable that, each hinge operation button 406 is disposed between two adjacent ones of the hinge units, and a length of the hinge unit is a distance between two adjacent ones of the hinge operation buttons 406.

It is preferable that, a driving motor is disposed on the support hinge storage case 405, so the flexible display 402 can be expanded by the driving motor instead of using manpower.

Figure 5:
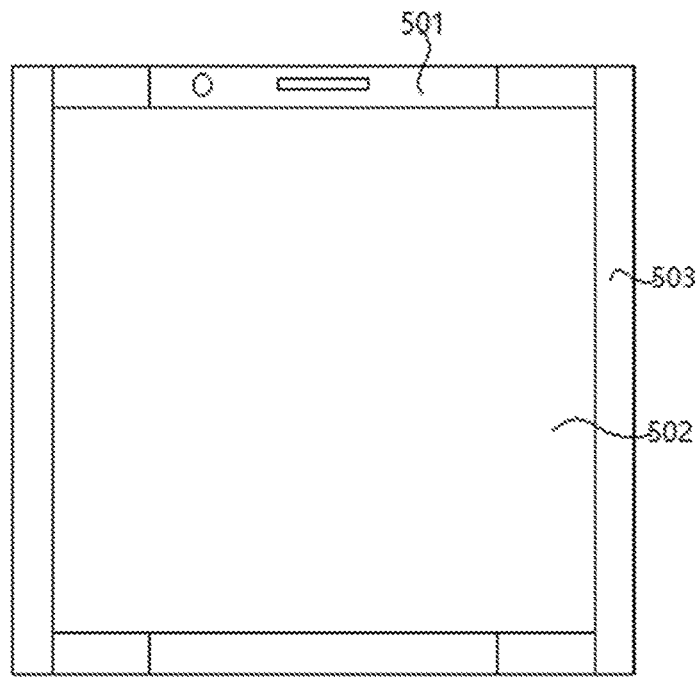
FIG. 5 is a front view showing that the foldable mobile terminal with the flexible screen is in the both-end expanded state.

FIG. 5 is a front view showing that the foldable mobile terminal with the flexible screen is in a both-end expanded state. A flexible display 502 is disposed on a surface of a housing panel 501. Two side plates 503 are disposed at two sides of the housing panel 501. The side plates 503 at two sides of the housing panel 501 are fixed to the flexible display 502 through the support hinge.

Figure 6:
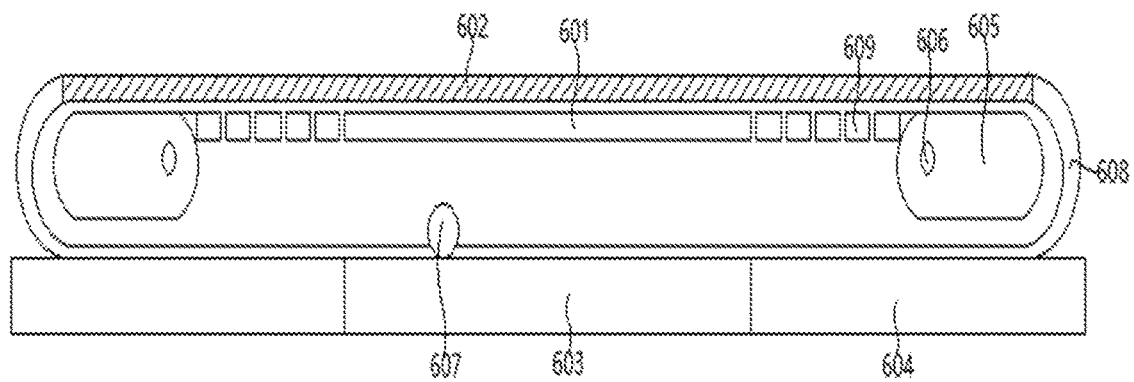
FIG. 6 is a cross-sectional view showing that the foldable mobile terminal with the flexible screen is in the both-end expanded state of FIG. 5.

FIG. 6 is a cross-sectional view showing the foldable mobile terminal with the flexible screen in the both-end expanded state. A flexible display 602 is disposed on a surface of a housing panel 601. A primary back plate 603 is disposed on a back side of the housing panel 601. Two extending back plates 604 are disposed at two ends of the primary back plate 603. The two extending back plates 604 are fully expanded and connected to two ends of the primary back plate 603. Two support hinge storage cases 605 are disposed inside the two side plates. A hinge operation button 606 is disposed on each support hinge storage case 605. A display pulling storage case 607 is disposed on a surface of the primary back plate 603. The display pulling belt 608 is disposed inside the display pulling storage case 607 and is connected to the flexible display 602. A support hinge 609 is disposed inside each support hinge storage case 605. The two support hinges 609 are fixed to a surface of the housing panel 601 through the two hinge operation buttons 606 on the support hinge storage cases 605.

Two ends of the flexible display 602 are disposed on surfaces of the support hinges 609 in the pulled-out state and are fixedly connected to the display pulling belt 608 extending over the support hinge storage case 607. The display pulling belt 608 completely pulls out the flexible display 602 received at two sides in the inside of the housing panel 601 and at the same time pulls out the support hinge 609 to support the flexible display 602.

When the hinge operation button 606 is pressed, a thickness of each of the hinge operation buttons 606 in the stretched state is less than a thickness of the hinge belt, and the hinge belt moves. The flexible display 602 is extendably connected to the display pulling belt 608.

By pressing on the hinge operation button 606 and manually exerting a force to the side plate at one side of the hinge operation button 606, the hinge belt moves. The flexible display 602 is extendably connected to the display pulling belt 608. The display pulling belt 608 pulls out the flexible display 602 received at two sides in the inside of the housing panel 601 and at the same time pulls out the support hinge 609. After the flexible display 602 is pulled to a suitable position, the hinge operation button 606 is released, so that the support hinge is locked, and the mobile terminal is in the both-end expanded state.

It is preferable that, the display pulling belt 608 is made of an elastic material, so that the display pulling belt 608 can constantly stay in the stretching state, thereby ensuring that the flexible display 602 continuously maintains in a flat and even state.

It is preferable that, a material inside the side plate is soft, and a surface roughness of the side plate is less than a surface roughness of the primary back plate. This facilitates pulling up the flexible display 602 received in the inside of the side plate.

It is preferable that the support hinge 609 consists of a plurality of hinge units, each hinge unit includes a hinge belt and a joint hinge, and the hinge belt and the joint hinge are integrally formed in one piece.

It is preferable that, each hinge operation button 606 is disposed between two adjacent ones of the hinge units, and a length of the hinge unit is a distance between two adjacent ones of the hinge operation buttons 606.

It is preferable that, a driving motor is disposed on the support hinge storage case 605, so the flexible display 602 can be expanded by the driving motor instead of using manpower.

Figure 7:
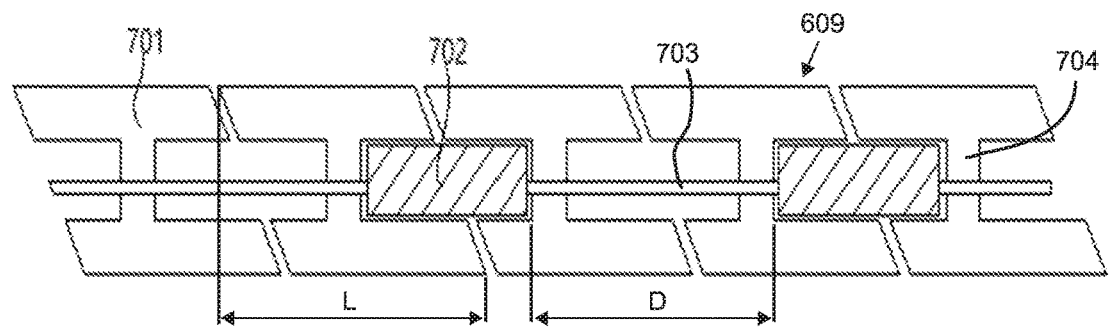
FIG. 7 is a schematic structural view showing a support hinge of the foldable mobile terminal with the flexible screen.

FIG. 7 is a schematic structural view showing the support hinge of the foldable mobile terminal with the flexible screen. The support hinge consists of a plurality of hinge units 701, each hinge unit 701 includes a hinge belt 703 and a joint hinge 704, and the hinge belt 703 and the joint hinge 704 are integrally formed in one piece. Each hinge operation button 702 is disposed between two adjacent ones of the hinge units 701, and a length L of each hinge unit 701 is a distance D between two adjacent ones of the hinge operation buttons 702.

The advantages of the foldable mobile terminal with the flexible screen of the present invention are as follows. The flexible display received in the housing panel is pulled out through the display pulling belt, and at the same time the support hinge is pulled out to support the flexible display. Accordingly, a size of the flexible display can be adjusted easily as desired, a thickness of the foldable mobile terminal decreases, and the foldable mobile terminal has good operability.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A foldable mobile terminal with a flexible screen, wherein the foldable mobile terminal with the flexible screen comprises a housing panel, a flexible display, a side plate disposed at both sides of the housing panel, a primary back plate, an extending back plate disposed at two ends of the primary back plate, a support hinge storage case, a plurality of hinge operation buttons, a display pulling belt storage case, and a display pulling belt; wherein the support hinge storage case is disposed inside the side plate, a support hinge is disposed inside the support hinge storage case, one end of the support hinge is connected to the housing panel, another end of the support hinge is fixedly connected to the support hinge storage case through the hinge operation buttons, one end of the display pulling belt is received in the display pulling belt storage case, another end of the display pulling belt is fixedly connected to the flexible display extending over the support hinge storage case, one end of the flexible display is extended to a surface of the support hinge storage case, which faces the primary back plate, and another end of the flexible display is disposed on a surface of the support hinge in a pulled-out state and is fixedly connected to the display pulling belt extending over the support hinge storage case, wherein two ends of the flexible display are fixedly connected to the display pulling belt extending over the support hinge storage case.

2. The foldable mobile terminal with the flexible screen according to claim 1, wherein two ends of the flexible display are disposed on the surface of the support hinge in the pulled-out state and are fixedly connected to the display pulling belt extending over the support hinge storage case.

3. The foldable mobile terminal with the flexible screen according to claim 1, wherein the display pulling belt is made of an elastic material.

4. The foldable mobile terminal with the flexible screen according to claim 1, wherein a surface roughness of the side plate is less than a surface roughness of the primary back plate.

5. The foldable mobile terminal with the flexible screen according to claim 1, wherein the support hinge consists of a plurality of hinge units, each hinge unit includes a hinge belt and a joint hinge, and the hinge belt and the joint hinge are integrally formed in one piece.

6. The foldable mobile terminal with the flexible screen according to claim 5, wherein each hinge operation button is disposed between two adjacent ones of the hinge units, and a length of the hinge unit is a distance between two adjacent ones of the hinge operation buttons.

7. The foldable mobile terminal with the flexible screen according to claim 5, wherein a driving motor is disposed in the support hinge storage case to expand the flexible display.

8. The foldable mobile terminal with the flexible screen according to claim 6, wherein a thickness of each of the hinge operation buttons in a resting state is greater than a thickness of the hinge belt, and the support hinge is fixed to a surface of the housing panel.

9. The foldable mobile terminal with the flexible screen according to claim 6, wherein a thickness of the hinge operation button in a stretched state is less than a thickness of the hinge belt, and the flexible display is extendably connected to the display pulling belt.

10. A foldable mobile terminal with a flexible screen, comprising a housing panel, a flexible display, a side plate disposed at both sides of the housing panel, a primary back plate, an extending back plate disposed at two ends of the primary back plate, a support hinge storage case, a plurality of hinge operation buttons, a display pulling belt storage case, and a display pulling belt; wherein the support hinge storage case is disposed inside the side plate, a support hinge is disposed inside the support hinge storage case, one end of the support hinge is connected to the housing panel, another end of the support hinge is fixedly connected to the support hinge storage case through the hinge operation buttons, one end of the display pulling belt is received in the display pulling belt storage case, and another end of the display pulling belt is fixedly connected to the flexible display extending over the support hinge storage case, wherein two ends of the flexible display are fixedly connected to the display pulling belt extending over the support hinge storage case; and the support hinge consists of a plurality of hinge units, each hinge unit includes a hinge belt on both sides of a joint hinge, the hinge belts and the joint hinge are integrally formed in one piece disposed between two adjacent ones of hinge operation buttons.

11. The foldable mobile terminal with the flexible screen according to claim 10, wherein two ends of the flexible display are disposed on the surface of the support hinge in the pulled-out state and are fixedly connected to the display pulling belt extending over the support hinge storage case.

12. The foldable mobile terminal with the flexible screen according to claim 10, wherein the display pulling belt is made of an elastic material.

13. The foldable mobile terminal with the flexible screen according to claim 10, wherein a surface roughness of the side plate is less than a surface roughness of the primary back plate.

14. The foldable mobile terminal with the flexible screen according to claim 10, wherein each hinge operation button is disposed between two adjacent ones of the hinge units, and a length of the hinge unit is a distance between two adjacent ones of the hinge operation buttons.

15. The foldable mobile terminal with the flexible screen according to claim 10, wherein a driving motor is disposed in the support hinge storage case to expand the flexible display.

16. The foldable mobile terminal with the flexible screen according to claim 14, wherein a thickness of each of the hinge operation buttons in a resting state is greater than a thickness of the hinge belt, and the support hinge is fixed to a surface of the housing panel.

17. The foldable mobile terminal with the flexible screen according to claim 14, wherein a thickness of the hinge operation button in a stretched state is less than a thickness of the hinge belt, and the flexible display is extendably connected to the display pulling belt.

* * * * *